Figure 1:
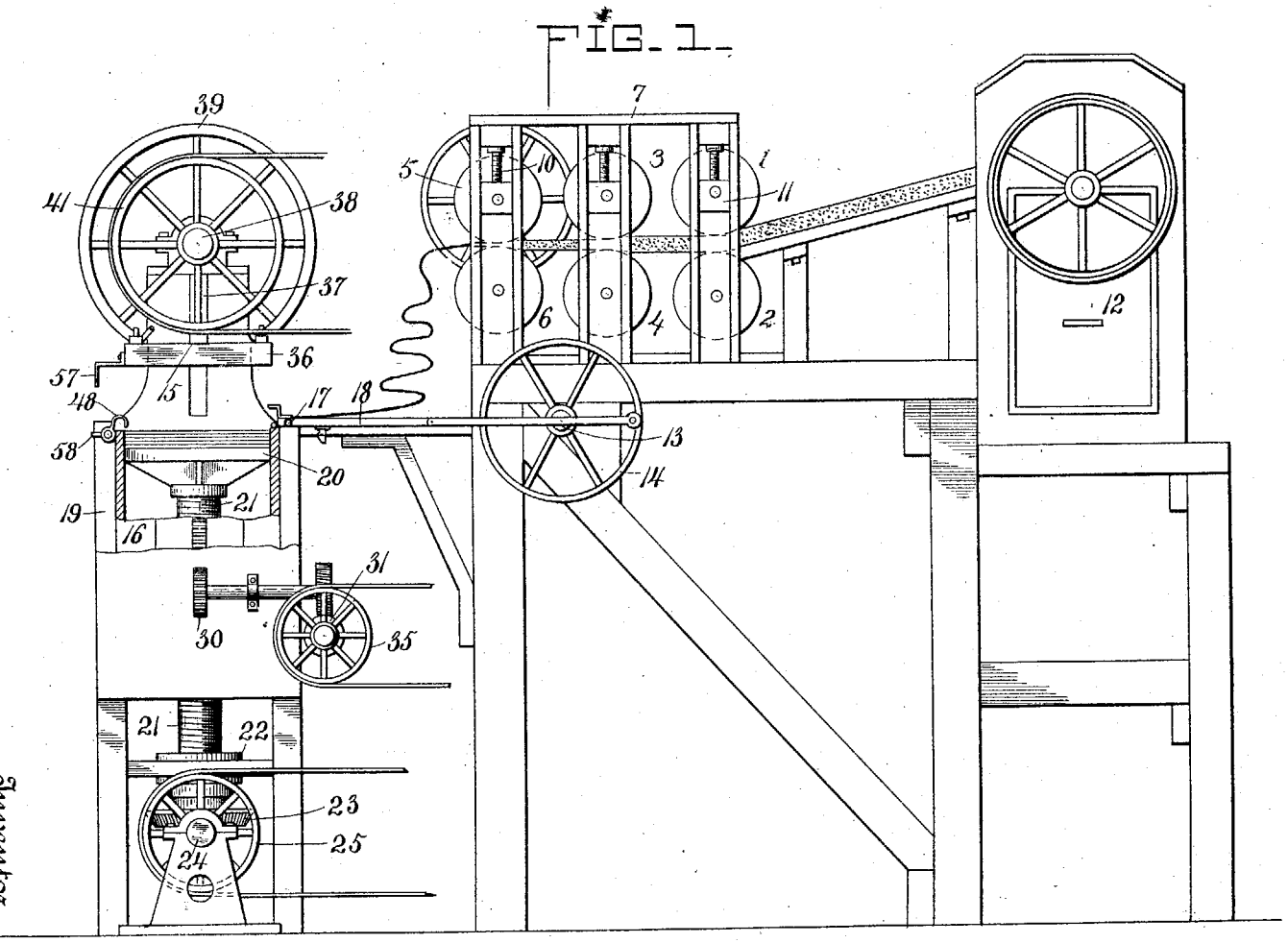

No. 11,769. Reissued Sept. 5, 1899.

C. E. MALLETT.

COTTON PRESS.

(Application filed July 28, 1899.)

7 Sheets—Sheet 1.

Witnesses
N. E. Allen
M. V. Bidgood

Inventor
Charles E. Mallett.
By Knight Bros
Attorneys

No. 11,769. Reissued Sept. 5, 1899.

C. E. MALLETT.

COTTON PRESS.

(Application filed July 28, 1899.)

7 Sheets—Sheet 2.

Witnesses
W. E. Allen
M. V. Bidgood

Inventor
Charles E. Mallett.
By Knight Bros
Attorneys

No. 11,769. Reissued Sept. 5, 1899.

C. E. MALLETT.

COTTON PRESS.

(Application filed July 28, 1899.)

7 Sheets—Sheet 3.

Witnesses
H. L. Allen
M. V. Bidgood

Inventor
Charles E. Mallett.
By
Attorneys.

No. 11,769. Reissued Sept. 5, 1899.

C. E. MALLETT.

COTTON PRESS.

(Application filed July 28, 1899.)

7 Sheets—Sheet 4.

Witnesses
H. E. Allen
M. V. Bidgood

Inventor
Charles E. Mallett.
By
Attorneys

No. 11,769. Reissued Sept. 5, 1899.

C. E. MALLETT.

COTTON PRESS.

(Application filed July 28, 1899.)

7 Sheets—Sheet 5.

Witnesses
W. E. Allen
M. V. Bidgood

Inventor
Charles E. Mallett.
By
Attorneys.

No. 11,769. Reissued Sept. 5, 1899.

C. E. MALLETT.

COTTON PRESS.

(Application filed July 28, 1899.)

7 Sheets—Sheet 6.

Witnesses

W. E. Allen

M. V. Bidgood

Inventor

Charles E. Mallett.

By [illegible]

Attorneys

No. 11,769. Reissued Sept. 5, 1899.

C. E. MALLETT.

COTTON PRESS.

(Application filed July 28, 1899.)

7 Sheets—Sheet 7.

Witnesses
M. E. Allen
M. V. Bilgood

Inventor
Charles E. Mallett.
By Kniger & Bros
Attorneys

UNITED STATES PATENT OFFICE.

CHARLES E. MALLETT, OF NEW YORK, N. Y., ASSIGNOR OF ONE-HALF TO CHARLES T. HARBECK AND EDMUND URQUHART.

COTTON-PRESS.

SPECIFICATION forming part of Reissued Letters Patent No. 11,769, dated September 5, 1899.

Original No. 607,063, dated July 12, 1898. Application for reissue filed July 28, 1899. Serial No. 725,436.

*To all whom it may concern:*

Be it known that I, CHARLES E. MALLETT, a citizen of the United States, residing in the city, county, and State of New York, have invented certain new and useful Improvements in Cotton-Presses, of which the following is a specification.

This invention relates to improvements in cotton-presses, and provides a press which is capable of taking the cotton right from the gin or condenser and compressing it into a bale of great density and of substantially rectangular shape and which is so simple in operation and so economical of power as to be adapted to the use of the ordinary cotton-gin operator. It is now the usual practice for the producer or gin-operator to bale the cotton in large loosely-packed bales, such as are capable of being made by direct compression in the small and comparatively weak presses at his command. These bales being then shipped to central points are compressed by large and powerful compresses to the size and density required for shipping or storing. The advantage over this method of double compression of direct compression at the point of production to the density requisite for final shipping and storing has been well recognized, as it leads to great saving in freight, rehandling, and storage and obviates also losses due to exposure of the loosely-packed bales to the weather and to thieves. It has also been recognized that the action of the present large compresses now in general use in forcibly compressing the original loose bales in bulk leads to serious disadvantages, in that the fibers are torn and matted, and the air confined in the bale not only renders it more readily inflammable, but not being able to escape is compressed, making the bale strongly elastic and difficult to compress and confine to its compressed limits. It has in fact been found that the cotton can be compressed to a greater density with less power and in a condition wherein it will form a compact and substantially inelastic bale by direct compression of the bat as it leaves the condenser into the form of a dense strip, which while being compressed is either wound into a cylindrical roll or is lapped back and forth to form a rectangular pile. This operation requires heavy and costly machinery, and, furthermore, the cylindrical bale, while advantageous in some respects, is objectionable in that it cannot be easily "sampled" and cannot be shipped or stored so compactly as rectangular bales of the same density, the interstices being not only wasteful of room, but to some extent a source of danger in case of fire. Moreover, the present machinery for handling of the "country" bales has been especially adapted to the usual shape of bale, and the operators being accustomed to it it is obvious that, other things being equal, a rectangular bale will find more ready acceptance, or in fact will pass as a matter of course when a cylindrical bale might be questioned. On the other hand, the machines which have hitherto been suggested for producing a rectangular bale from the bat by a gradual or accumulative action have been rather complicated in operation and have required an amount of power disproportionate to the effects produced. This has apparently been due to the fact that they have effected the compression of the bat into the bale in the very act of laying it over or lapping it. Now as the force of compression thus required is very considerable, even when the bat has been previously compressed by rollers, it is clear that motion of the compressing parts over the surface of the cotton, even if these compressing parts are in the form of rollers, will be productive of great friction. To avoid these objections, I have designed a machine which first compresses the bat as far as possible by passing it between rollers, then lays and folds it into the press-box, and after each lay or fold compresses it by a direct pressing or tramping action. The laying and pressing agencies thus operate alternately and not in conjunction, so that the laying is accomplished without friction and the pressing is effected by direct thrust and not by a rolling or sliding action. As the bat is folded and then compressed layer by layer into the box the bottom of the latter is gradually withdrawn from the plunger, so as to leave room for the reception of the next layer. When the box has been packed full in this manner, the bale is given a final compression, and temporary clamping devices are then adjusted to the bale, which is then removed from the press and secured by the usual ties or otherwise. These temporary clamping devices being quickly applied, the stoppage of the machinery is lessened and the continuity of the operation furthered. There is thus obtained a bale of a density equal to or greater than the ordinary compressed bale and of the same shape as the ordinary bale. As the air is pressed from the bat and from between the several layers of the bat successively and from one part at a time, it can be much more effectually removed then by direct compression in bulk, and the resulting bale is therefore comparatively inelastic. For this reason, and also for the very fact that the compression is effected in numerous successive stages, but little power is required, and the machine is therefore adapted for use as an adjunct to a cotton-ginning plant.

Figure 2:
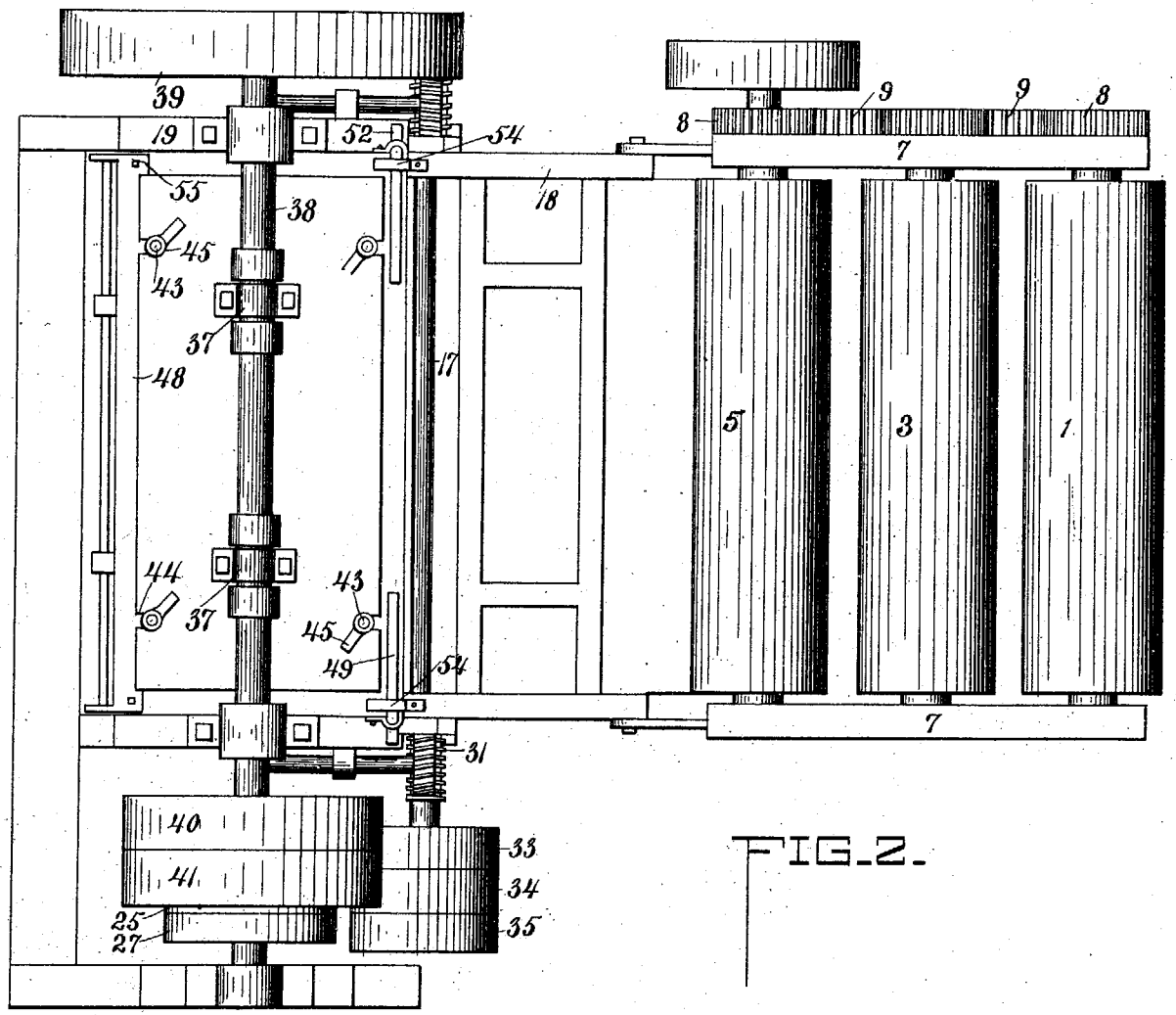
Figure 3:
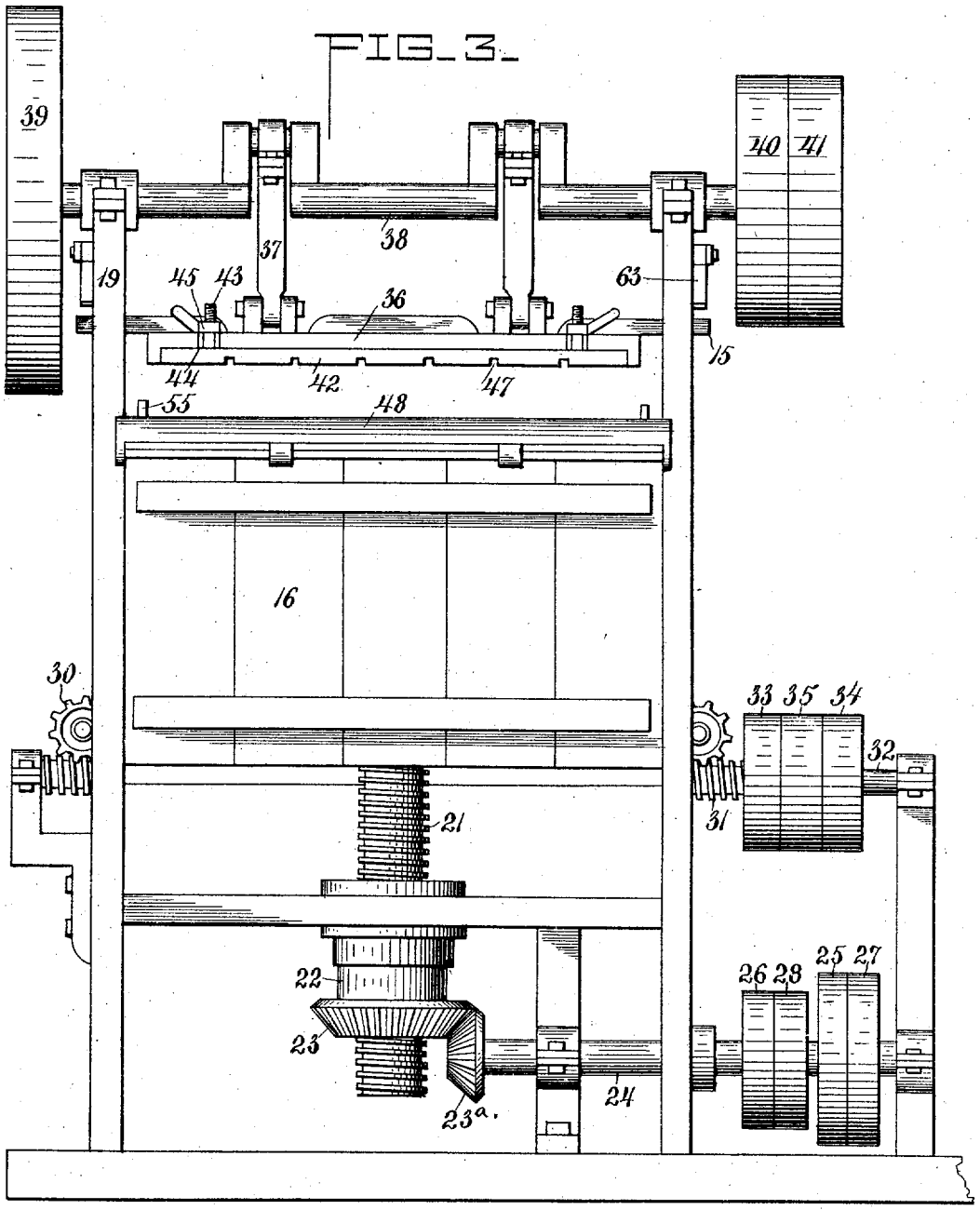
Figure 4:
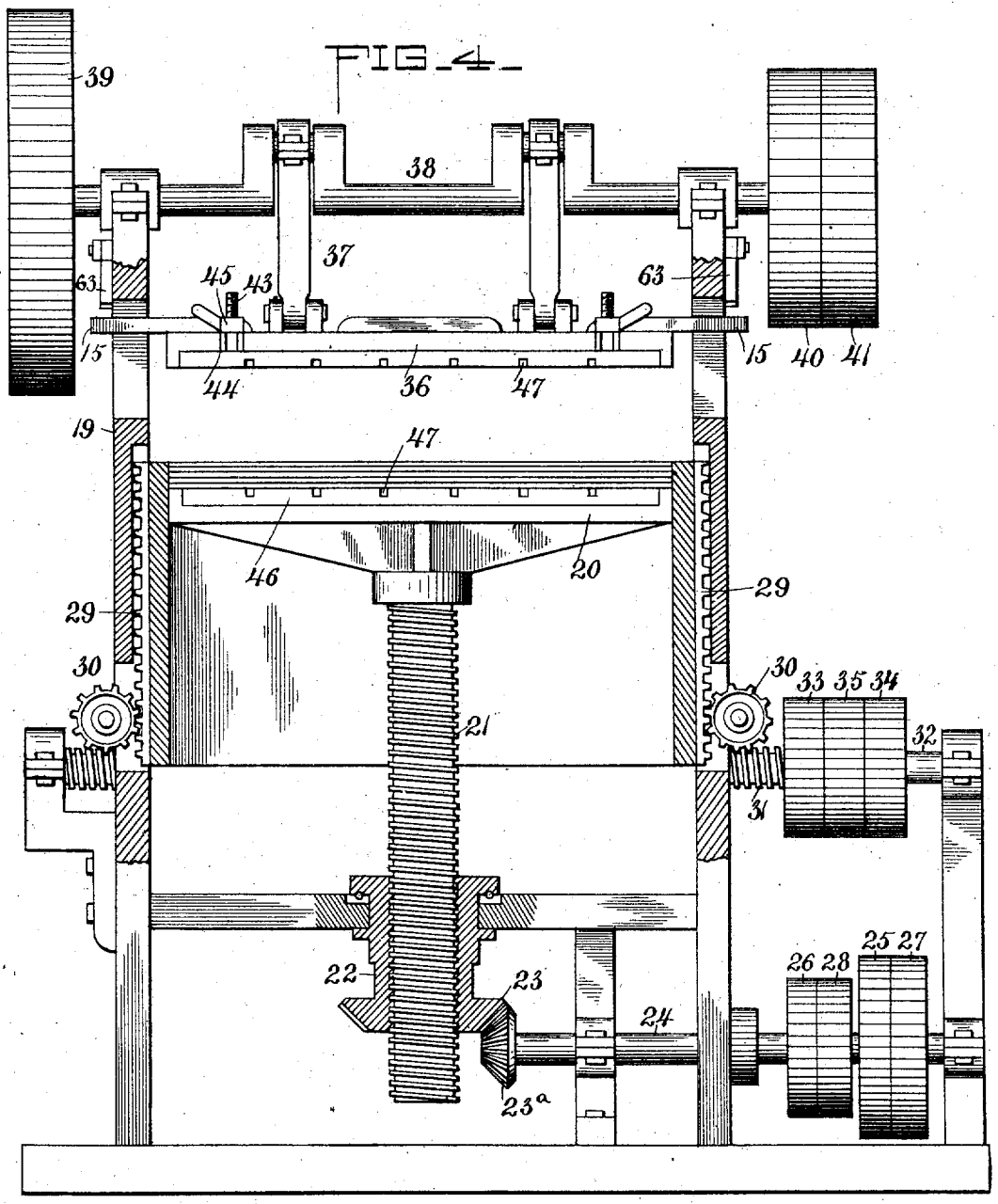
Figure 5:
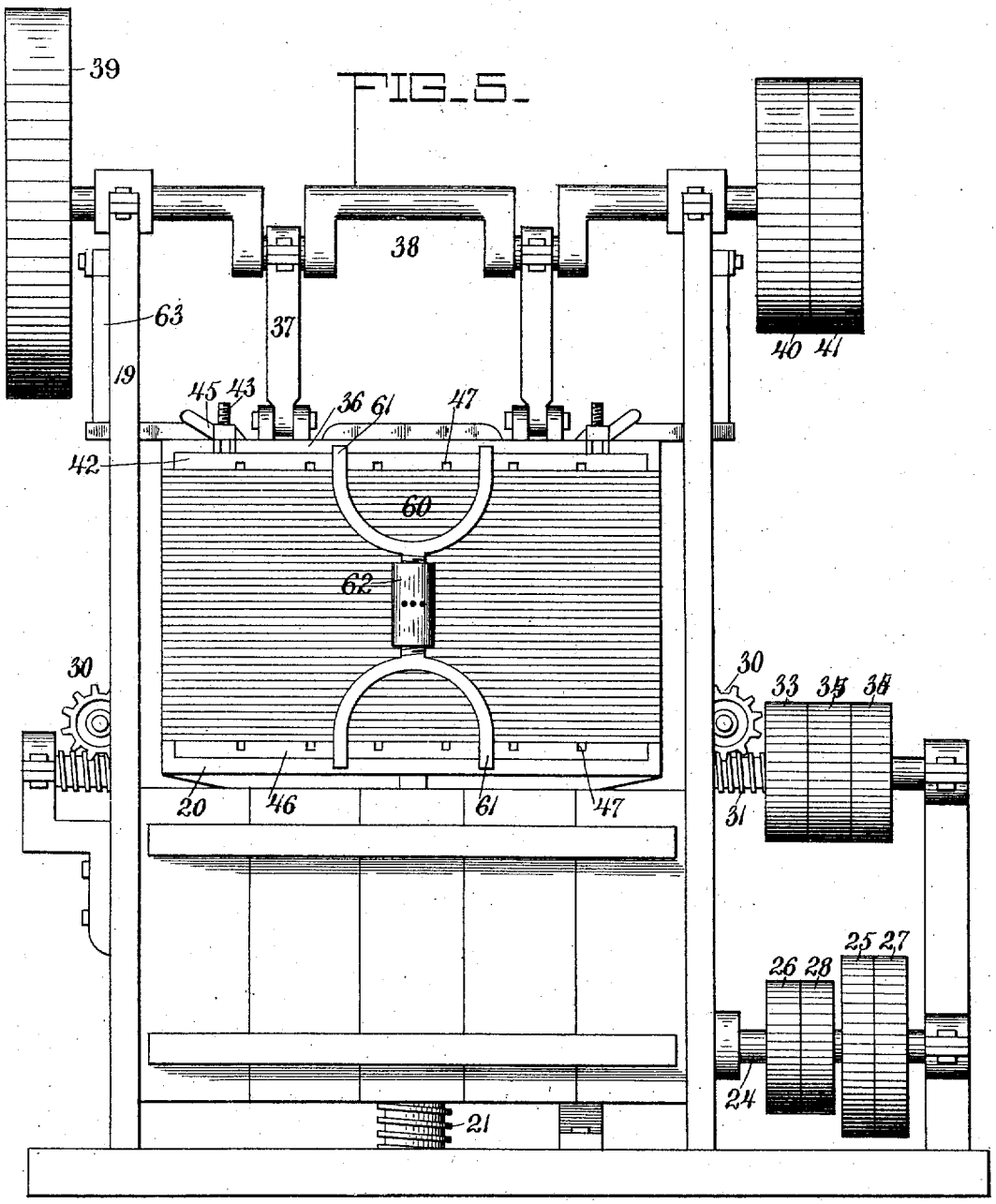
Figure 6:
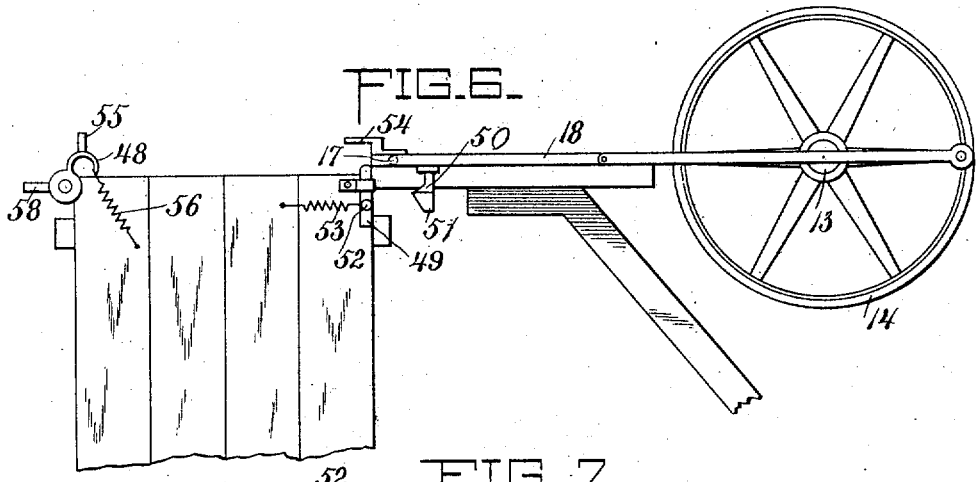
Figure 7:
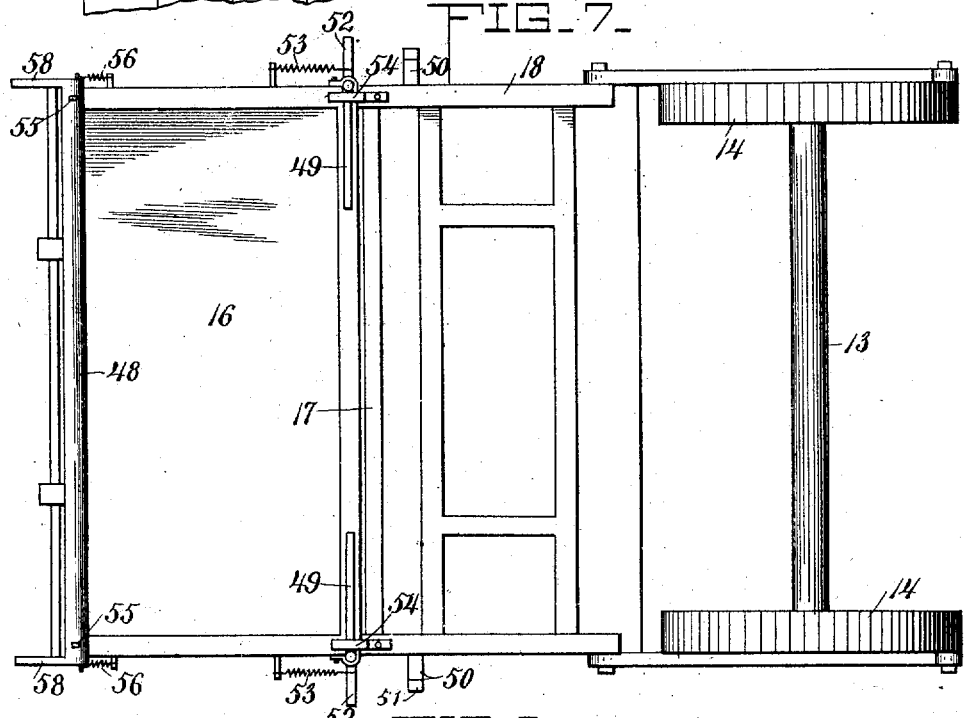
Figure 8:
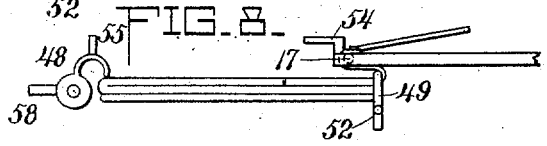
Figure 9:
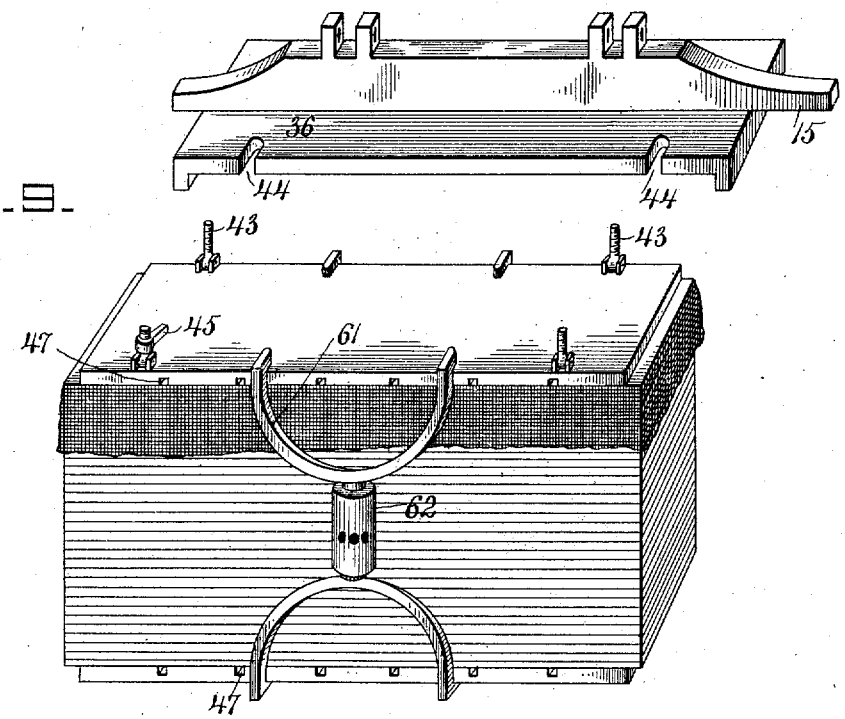
Figure 10:
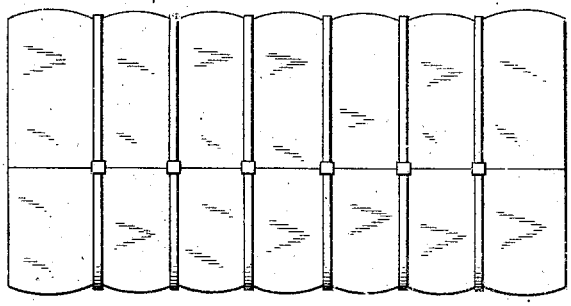

Referring to the accompanying drawings, which form a part of this specification Figure 1 is a somewhat diagrammatic side elevation of a cotton-press embodying my invention, showing the general relations of the several parts to one another and to the condenser of a gin. Fig. 2 is a top view of the apparatus, including the compressing-rolls and the baling-press. Figs. 3 and 4 are respectively a side elevation and a vertical section of the baling-press in the condition of operation. Fig. 5 is a side view of the baling-press as it appears after the bale is formed and clamped, the box wherein the bale is formed having been lowered. Figs. 6 and 7 are respectively side and top views of the bat-folding apparatus, and Fig. 8 shows a detail thereof. Fig. 9 shows the compressed and clamped bale and the plunger-plate above but removed from same. Fig. 10 shows the completed bale.

My improved machine comprises three main portions—namely, a series of rollers for successively compressing the bat until it reaches a maximum density, a folding or laying apparatus for folding it into the press-box, and a pressing device for compressing the successive layers into the box.

1 2 3 4 5 6 represent three sets of rollers journaled in a suitable frame 7 and driven by appropriate gearing, as by gear-wheels 8 and idlers 9. The distances between these rollers are adjusted and determined by suitable adjusting devices, such as adjusting-screws 10, applied to the bearings 11 of said rollers, and the distance is greatest from the first set of rollers 1 2 and successively less for the following sets. The bat (represented as coming from the condenser 12 of a cotton-ginning apparatus) passes between these sets of rollers in succession, and is thus gradually and successively compressed. A much more uniform and dense compression is thus attained than would be possible with a single set of rollers. From these compressing-rolls the continuous and compressed bat proceeds to the folding apparatus, which is placed in the part of the baling apparatus adjacent to the plunger and serves to fold the bat in layers into the press-box 16. The bat after leaving the rolls aforesaid first passes over a pusher roller or rod 17, carried by a reciprocating slide 18, which causes said pusher 17 to travel back and forth above the press-box, and thus to lay the bat in successive layers or folds into the press-box. This reciprocating slide is operated by a connection-rod and crank connection from a shaft 13, driven by pulley 14, which is operated by belting or in any suitable manner, so as to be set in operation when required. The press-box 16 slides vertically in a frame 19, and a supporting-platen 20 slides vertically within said press-box, being supported and actuated by a screw 21, the term "vertically" being here used in the sense of perpendicular to the plane of the platen and the term "supporting," as applied to the platen, referring to its function of supporting the cotton against the compressive action of the plunger. The screw 21 is in turn supported and actuated by a nut 22, which is driven through gears 23 23ª from driving-shaft 24. Two sets of driving-pulleys 25 26 are provided for this shaft, the pulley 25 serving to drive the shaft slowly for the movement of the platen 20 away from the plunger and the pulley 26 reversing the motion and giving a comparatively rapid upward movement. Each of these pulleys has a loose pulley 27 or 28 and suitable belt-shifting devices for throwing it out of action. The box 16 is also provided with means for moving it toward and away from the plunger, such means consisting, for example, of a rack 29 on each side of the box, pinions 30, engaging with said racks, worms 31 on shaft 32 driving said pinions, and suitable direct and reverse driving-pulleys 33 34 on said shaft, a loose pulley 35 and belt-shifting mechanism being provided to enable the said box 16 to be raised or lowered or held in either position.

A plunger 36, guided in the frame so as to reciprocate vertically—that is, in a direction perpendicular to the plane of the plunger—is operated by cranks 37 on shaft 38, which is journaled in the frame and carries a fly-wheel 39 and fast and loose pulleys 40 and 41, said cranks being connected to the plunger. The preferred form of the plunger is shown in Fig. 9. Belt-shifting devices are also provided for these pulleys, whereby the motion of the plunger may be arrested or started, as required. Arms 63, pivoted to the side of the frame, can be dropped or turned onto the guiding projections 15 of the plunger when the latter is in its lowest position, so as to lock it in that position. This plunger makes an up-and-down or reciprocating stroke for each to-and-fro movement of the pusher 17, the plunger coming down onto the bat just as the pusher retreats to its innermost position—that is, nearest to the compressing-rolls 5 6. A plate 42 is attached to the bottom of plunger 36 by means of swiveled bolts 43, which enter slots 44 in the plunger and are secured by hand-nuts 45 and a plate 46 rests on platen 20, these two plates 42 46 having transverse grooves 47 in their faces which are turned toward one another, said grooves serving to receive the binding-ties, as hereinafter explained.

To determine and maintain the exact and even folding of the bat at each end of the box 16, there is attached to said box at its outer end a pivoted comb or clamp 48, whose serrated edge falls on and clamps the edge or fold of the bat as it is left by the retreating pusher, and there are pivoted to the inner end of the box two folding-arms 49, which move laterally out of the way of the bat as the pusher is retreating and after it has passed them fly inwardly over the bat, so as to form or locate the bend or fold on the next outward movement of the pusher, these arms thus constituting retaining devices for the bat. This movement of the arms is controlled by tappets or dogs 50 on each side of the slide 18, each of which has a pivoted finger 51, which rides over the pin 52 on the arm 49 when the slide is moving outwardly, but catches on said pin when the said slide is retreating, and thus causes the arm 49 to turn on its pivot out of the way of the bat. As the slide retreats farther and just as it completes its movement in that direction the finger 51 slips off of pin 52 and allows the arms 49 to fly inwardly under the influence of spring 53, so as to strike the end of the bat and definitely locate the point of folding on the next outward movement of the pusher. A finger 54 on the slide 18 engages with an arm 55 on the pivoted clamp 48 as said slide approaches its outermost position, and thereby lifts the clamp off of the bat and out of the way of the pusher 17. As soon as the slide retreats the finger 54 is withdrawn from the arm 55 and the clamp 48 under the influence of its spring 56 falls on the edge or fold of the bat and holds it tightly in place. The plunger 36 also carries fingers 57, which engage with arms 58 on the pivoted comb or clamp 48 as the plunger descends, thereby lifting said clamp out of the way of the plunger.

The operation of this folding and compressing apparatus is as follows: The box 16, having been run up to the position shown in Fig. 1 and the supporting-platen 20 also having been run up to its highest position and the plunger being raised, the lower piece of bagging is placed on the supporting-plate, the end of the bat is drawn over the pusher roll or rod 17, then back under the arms 49, and then out and across to the clamp or comb 48, which holds it against the platen 20. The apparatus being then set in motion, the bat is fed continuously through the compressing-rolls 1 2 3 4 5 6 and is laid down layer after layer by the pusher 17, each forward movement of the pusher carrying a loop of the bat to the outer end of the box 16, where it is caught by the clamp or comb 48, and the back movement of the pusher then throws the arms 49 out. While the arms are still in their outer position, the plunger 36 comes down and compresses the two layers thus deposited on the platen 20, and as said plunger rises the slide 18, having completed its inward movement, allows the arms 49 to fly in over the uppermost layer of the bat and to form a new fold and give a point of support from which the pusher can carry the bat. Meanwhile the platen 20 has been gradually, under the operation of its supporting-screw, withdrawn from the plunger, and this operation is so adjusted that the fall during one full up-and-down stroke of the plunger is about equal to the eventual thickness of two layers of the bat. As the folding device keeps piling in additional layers of the bat they are pressed down successively by the plunger and the supporting-platen falls sufficiently to make room for the next layers, and so the operation proceeds until the box is full. The apparatus is then stopped. The upper piece of bagging is then laid on top of the cotton. The plunger is brought to its lowest position and preferably locked there by stop-arms 63. Then the screw is reversed and the lower plate run up rapidly, so as to take up any looseness of the top layers of the bale, and at the same time the box 16 is run down out of the way, and the bale may then be tied in the usual manner by ties passed through the grooves 47 in the plates 42 46. As, however, the tying operation consumes some little time, I prefer to clamp the bale in its compressed condition by quickly-applied clamps, the bale being then removed and the machine allowed to start on the compression of a new bale. For this purpose I prefer to use the form of clamp indicated at 60 in Figs. 5 and 9, the same consisting of two double-pronged jaws 61, adjustably connected together by a turnbuckle connection 62. One of these clamps being applied at each side of the bale, so that the jaws thereof engage over the edges of the plates 42 46, the turnbuckles thereon are screwed up tight, the hand-nuts 45 are loosened and on one side removed, and the bale is then removed from the press along with plates 42 46 and the clamps 60. The new plate 42 46 may then be put on the press and a new bale be formed while the last one is being tied.

It will of course be understood that bagging or covering of some sort will be applied to the bale, the same being partly inserted at the bottom of the box before the formation of the bale is commenced and partly laid on top the bale before the plunger is brought down for the last time, the covering then being drawn together and the ties placed over it.

A distinguishing feature in the operation of this machine is its graduated action, whereby the cotton is compressed and the air removed from same in three well-defined steps. First comes the compression of the bat itself by the compression-rolls. Then this bat is folded in layers, each layer as it is laid down being squeezed against the lower layers to remove the air as far as possible between it and the next lower layer, and finally when all the layers are laid down the press is brought into the position of greatest compression, whereby the layers are brought into the closest possible contact before clamping and tying.

It will be noted that the folding of the cotton-bat is effected at a time when the plunger has been raised or withdrawn so far as to be completely free of the cotton and of the folding apparatus, so that the latter can operate freely and without any resistance from the plunger, and also that the folding apparatus is then entirely withdrawn from the path of the plunger, so that the latter can operate without interference therefrom. The folding apparatus and the compressing-plunger are thus brought into action alternately. It is clear that without departing from the spirit of my invention the action of the folding apparatus might lay down more than one fold between the successive operations of the plunger and, on the other hand, that each action of the plunger might effect several compressions between the successive actions of the folding apparatus. In stating, therefore, that the folding apparatus and the plunger act or are brought into action alternately I desire the word "action" to be construed in a broad sense as referring to the general or total operation of said parts rather than to a single movement thereof.

It is apparent that the general features of my invention—namely, the compression of the bat, the laying of same in successive folds on a supporting-platen, the compression of these folds by a reciprocating plunger acting alternately with the folding means, and the final compression by the movement of the platen—are equally applicable whether the machine be used in a vertical, a horizontal, or an inclined position, the changes which will be required to adapt the mechanism to work in any given position being simply matters of design and engineering skill. My invention is therefore not limited in respect of the position or general direction of the machine. Moreover, as regards the box-shifting mechanism for bringing the inclosing-box into position around the bale during formation of the bale and for withdrawing it to enable tying and removing the bale it is evident that the mechanism shown for this purpose is adapted to operate in whatever position or direction the machine be placed.

Having thus described my invention, the following is what I claim as new therein and desire to secure by Letters Patent:

1. In a cotton-press, the combination with a supporting-platen, a plunger reciprocating toward and away from said platen, and folding apparatus for laying a bat of cotton in continuous, successive, superposed folds between said platen and plunger, operating means for said folding apparatus bringing the same into action when the plunger is most removed from the platen, and then withdrawing said folding apparatus to permit of the operation of the plunger, and means for bringing said plunger into action alternately with the action of the folding apparatus.

2. A cotton-press comprising means for forming and feeding a continuous bat of cotton, a supporting-platen, a reciprocating plunger, folding apparatus for laying the continuous bat of cotton in successive folds between said plunger and platen, and means for moving the plunger away from the supporting-platen so as to be completely free of the cotton and the folding apparatus and to permit of the operation of the folding apparatus, and to then bring said plunger toward said platen so as to compress the folded bat, the folding apparatus and the plunger acting alternately.

3. A cotton-press comprising means for compressing and feeding a continuous bat of cotton, a supporting-platen a plunger reciprocating toward and away from said platen, folding apparatus for laying the continuous bat of cotton in successive folds between said plunger and platen, and actuating means for operating said plunger and said folding apparatus in repeated alternation so as to form the bale by a series of steps of alternate folding and compression.

4. A cotton-press comprising means for forming and feeding a continuous bat of cotton, a supporting-platen, a plunger movable toward and away from said platen, folding apparatus for laying the continuous bat in successive folds between said platen and plunger, and means for operating said plunger, after each fold is laid down, to press such fold against the preceding folds by a direct tramping action.

5. A cotton-press comprising means for forming and feeding a continuous bat of cotton, a supporting-platen, a plunger movable toward and away from the platen, folding apparatus for laying the continuous bat of cotton in successive folds between said platen and plunger, means for operating the plunger, in alternation with the folding apparatus, to compress the bat so folded, means for gradually withdrawing the platen from the plunger, as the bat is successively folded and pressed, and means for raising said platen to finally compress the bale.

6. In a cotton-press, the combination of a reciprocating plunger, a supporting-platen, means for gradually withdrawing the platen from the plunger, a folding device for folding a bat of cotton in superposed layers on said platen, means for reciprocating the plunger toward and away from the supporting-platen so as to compress the folds of bat against the supporting-platen, a movable box adapted to surround the platen and means for moving said box to cause it to surround the platen and the cotton during formation of the bale, or to be withdrawn therefrom.

7. In a cotton-press, the combination with means for supplying a continuous bat of cotton, a supporting-platen, a plunger, means for moving said plunger, repeatedly toward and away from the platen during the formation of a bale, and a folding apparatus operating at the times when the plunger is farthest away from the platen to fold the continuous bat in successive layers between the plunger and platen, such successive layers being thus repeatedly compressed by the repeated operation of the plunger.

8. A cotton-press comprising means for supplying a continuous bat of cotton, a supporting-platen, a plunger movable toward and from said platen, a driving means, a crank connection between said driving means and said plunger whereby the latter is repeatedly reciprocated during the formation of a bale, a folding apparatus for folding the bat in layers between the plunger and platen, and means for operating said folding apparatus in alternation with the movements of the plunger.

9. In a cotton-press, the combination with the supporting-platen and the plunger, of a lower plate resting on the platen and an upper plate having means for removably attaching it to said plunger consisting of swivel bolts and nuts, and adjustable clamps with means for removably securing them to the aforesaid plates, whereby the said plates may act substantially as parts of the platen and plunger during the formation of the bale, and may then be secured over the bale by clamps and removed together with the bale from the press.

10. In a cotton-press, the combination with the supporting-platen, a plunger reciprocating toward and away from said platen, a reciprocating pusher for folding a bat of cotton between said platen and plunger, a clamping device located at one end of the path of said pusher, to hold the fold of cotton left by the pusher, and means operated by the movement of the plunger toward the platen to release said clamping device from the bat of cotton.

11. In a cotton-press, the combination with a reciprocating pusher for folding a bat of cotton, of a retaining device for the bat located at one end of the path of the pusher, and entering the path of the pusher laterally, means operated by the pusher to release the retaining device from the bat as the pusher approaches that end of its path and means for restoring the said device to engagement with said bat as the pusher reaches the end of its stroke, so that as the pusher reverses its movement, the bat will be folded over said retaining device.

12. In a cotton-press, a folding device comprising a reciprocating pusher adapted to engage with the bat and to fold it in successive layers, pivoted arms located at one end of the path of the pusher and engaging with the bat so as to form a fold therein, means connected to the pusher for removing said arms from engagement with the bat when the pusher is passing the same in one direction, and means for returning the arms to engagement with the bat when the pusher has completed its motion in that direction.

C. E. MALLETT.

Witnesses:
HARRY E. KNIGHT,
M. V. BIDGOOD.